Oct. 3, 1967    W. D. HOFER    3,344,908
ADJUSTABLE NYLON PICKUP TOOTH FOR GRAIN
HARVESTERS, HAY BALERS AND THE LIKE
Filed Oct. 31, 1966
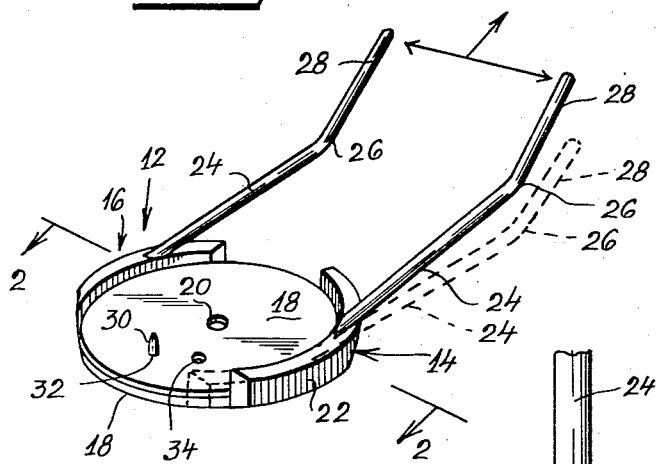
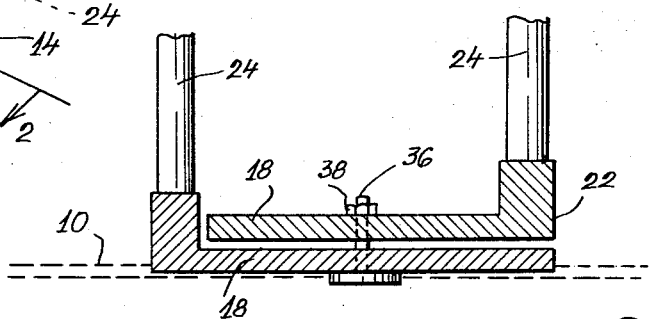
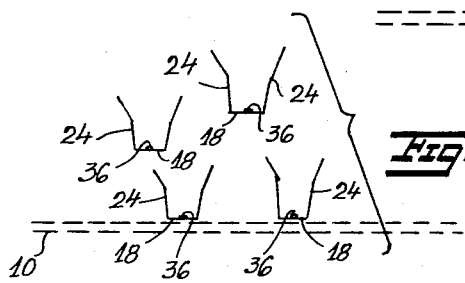
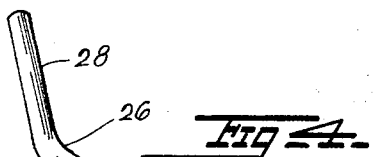
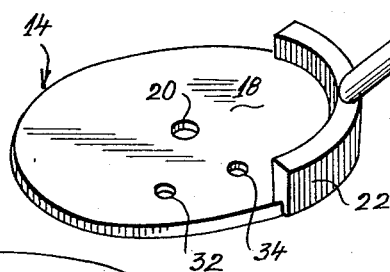
INVENTOR
Walter David Hofer
BY Polachek & Saulsbury
ATTORNEYS

United States Patent Office 3,344,908
Patented Oct. 3, 1967

3,344,908
ADJUSTABLE NYLON PICKUP TOOTH FOR GRAIN HARVESTERS, HAY BALERS AND THE LIKE
Walter David Hofer, Brocket, Alberta, Canada, assignor of fifty percent to John C. Swinarton, Fort Macleod, Alberta, Canada
Filed Oct. 31, 1966, Ser. No. 590,746
6 Claims. (Cl. 198—198)

This invention relates generally to pickup attachments for use on grain harvesters or hay balers, and more particularly to an adjustable molded plastic pickup tooth assembly to be used on a belt type pickup as in common use.

In grain pickups of this character using teeth attached to a belt, the teeth become bent or damaged and have to be replaced, which operation in most cases is difficult.

The present device is designed to overcome these difficulties by the use of replaceable, resilient, adjustable pickup teeth to minimize bending or breaking and a sectional tooth assembly by which the teeth can be readily removed and replaced again when required for repairing or for replacement of the teeth.

Another important object of the present invention is to provide a pickup tooth assembly wherein the ends of the teeth may be readily set at any desired angle so that the ends thereof may be wide or in a straight line in relation to each other.

A further object of the invention is to provide a pickup tooth assembly so constructed that a number of such assemblies may be alternately positioned or staggered on the belt to allow greater spread on the belt.

In the drawings, wherein is disclosed a preferred embodiment of the invention.

FIGURE 1 is a top perspective view of a pickup tooth assembly embodying the invention.

FIG. 2 is a cross-sectional view taken on the plane of the line 2—2 of FIG. 1.

FIG. 3 is a top perspective view of the right hand tooth member of FIG. 1.

FIG. 4 is a top perspective view of the left hand tooth member of FIG. 1.

FIG. 5 is a diagrammatic view showing the staggered position of the pickup tooth assemblies on the belt.

Referring now in detail to the various views of the drawing, my improved pickup tooth assembly is for attachment on a tooth carrier such as a conveyor belt 10 of a harvester or hay baler pickup. In FIG. 1, there is illustrated a pickup tooth assembly embodying the invention and designated generally at 12.

The pickup tooth assembly 12 is formed of plastic material such as nylon, polyethylene, polystyrene or other plastic material which may be injection molded for high production rate at a low cost.

The tooth assembly 12 is sectional comprising a pair of separable tooth units, a right hand tooth unit 14 and a left hand tooth unit 16 as viewed in FIG. 1. Each of the tooth units 14 and 16 comprises a circular flat base or disc member 18 with a circular opening 20 in the center thereof. Along a portion of the peripheral edge thereof, there is an arcuate shaped upstanding flange portion 22 formed integrally with the base or disc 18.

In the right hand tooth unit 14, the flange portion 22 is positioned at the right of the base or disc as seen in FIGS. 1 and 3, and in the left hand unit 16, the flange portion 22 is positioned at the left of the base or disc as seen in FIGS. 1 and 4.

An elongated tooth 24, substantially round in cross-section, is formed integrally with the top edge of each flange portion 22 midway the ends thereof. The body of the tooth is bent remote from its free end as indicated at 26 whereby the end portion 28 thereof is disposed at a slight angle to the plane of the body of the tooth. The body of the tooth extends at an angle so that the major portion thereof extends clear of the belt 10, and at a rearwardly inclined angle from the plane of the base or disc 18 and belt 10 in relation to the direction of travel thereof. The tooth 24 is long enough to permit flexing thereof.

In accordance with the invention, the base or disc 18 of the left hand tooth unit 14 has a tapered pin 30 protruding therefrom between the opening 20 and peripheral edge thereof. In order to receive this pin 30, the base or disc 18 of the right hand tooth unit 14 is formed with a pair of spaced holes 32 and 34 between the opening 20 and the peripheral edge thereof, the holes being spaced circumferentially around the body of the base or disc.

In use, the tooth units 14 and 16 are assembled by placing the right hand tooth unit 14 over the left hand tooth unit 12 in superimposed position, one of the holes 32 or 34 being slipped over the protruding pin 30 on the base 18 of the left hand unit 16 as seen in FIGS. 1 and 2. By reason of the pin and hole arrangement in the bases, the relative positions of the right and left hand units may be adjusted whereby the teeth 24 of the units may be brought closer or farther away from each other in order to vary the angle of the teeth in relation to the belt.

The pickup tooth assembly 12 may be secured to the belt 10 by means of a headed bolt 36 extending through aligned holes in the belt and bases or discs secured in position by lock nut 38 as seen in FIG. 2. This is desirable for better picking up certain kinds of grain and for stripping off the grain or hay from the pickup.

The pickup tooth assemblies 12 are positioned alternately or in staggered relation on the belt to allow for greater spread on the belt as shown diagrammatically in FIG. 5.

While I have illustrated and described the preferred embodiments of my invention, it is to be understood that I do not limit myself to the precise construction herein disclosed and that various changes and modifications may be made within the scope of the invention as defined in the appended claims.

What is claimed is:
1. An adjustable pickup tooth assembly of the kind described comprising a sectional body composed of a pair of tooth units each unit including a circular base with a central opening therein, opposed arcuate shaped upstanding flanges along the peripheries of the bases, teeth extending from the flanges at an angle to the plane of the bases, the bases being adjustably mounted in superimposed relation to each other, with the holes therein in alignment to receive a fastening element for fastening the assembly to a belt.

2. A pickup tooth assembly of the kind described as defined in claim 1, wherein the base of one tooth unit has a pin protruding upward therefrom, the base of the other tooth unit having spaced holes circumferentially of the base for receiving said pin in adjusted position.

3. An adjustable pickup tooth assembly of the kind described as defined in claim 1, wherein the bodies of the teeth are bent at a slight angle remote from the free ends thereof.

4. An adjustable pickup tooth assembly of the kind described as defined in claim 1, wherein the angle of the disposition of the teeth is such that the major portion of the teeth extend clear of the supporting belt and rearwardly inclined from the plane of the base and supporting belt in relation to the direction of travel thereof.

5. A pickup assembly of the kind described as defined in claim 4 wherein the bodies of the teeth are bent at a slight angle remote from the free ends thereof.

6. A pickup tooth assembly of the kind described as defined in claim 5, wherein the base of one tooth unit has a pin protruding upwardly therefrom, the base of the other tooth unit having spaced holes circumferentially of the base for receiving said pin in adjusted position.

References Cited

UNITED STATES PATENTS 3,099,347   7/1963   Dahlquist _____ 198—198

EVON C. BLUNK, *Primary Examiner.*

EDWARD A. SROKA, *Assistant Examiner.*